United States Patent [19]
Motoi

[11] Patent Number: 4,614,406
[45] Date of Patent: Sep. 30, 1986

[54] LIQUID CRYSTAL DISPLAY DEVICE
[75] Inventor: Etsuo Motoi, Mishima, Japan
[73] Assignee: Nippon Seiki Co. Ltd., Niigata, Japan
[21] Appl. No.: 741,186
[22] Filed: Jun. 4, 1985

Related U.S. Application Data
[63] Continuation-in-part of Ser. No. 424,555, Sep. 27, 1982, abandoned.

[30] Foreign Application Priority Data
May 31, 1982 [JP] Japan .................. 57-93379

[51] Int. Cl.⁴ .................. G02F 1/13; G08B 5/36
[52] U.S. Cl. .................. 350/334; 340/718
[58] Field of Search .......... 340/718, 765; 350/334, 350/330, 343, 345

[56] References Cited
U.S. PATENT DOCUMENTS
4,257,041  3/1981  Masucci .................. 340/718 X
4,367,467  1/1983  Emile .................... 340/718 X Primary Examiner—Donald A. Griffin
Attorney, Agent, or Firm—Flehr, Hohbach, Test, Albritton & Herbert

[57] ABSTRACT

A liquid crystal display device, which comprises a light transmissive carrier made as a foundation piece for assembly. A display section and a retainer covering the front side of the display section are positioned and locked to the front side of the carrier. An electric circuit section is positioned and locked to the rear side of the carrier. Thus, the device can be accurately and easily assembled. Also, uncomfortable noise due to external vibrations can be eliminated. To enhance the reliability of recognition, a reflector is provided on the rear side of the light transmissive carrier while a semi-transparent reflector is provided between the display section and carrier. The retainer is electrically connected to a ground potential part of the electric circuit section to prevent adverse effect of an electrostatic charging phenomenon that might otherwise result. A reflected light adjusting section is provided on the surface of the reflector to eliminate variations of the illumination light intensity over the display area.

6 Claims, 22 Drawing Figures

LIQUID CRYSTAL DISPLAY DEVICE

CROSS-REFERENCE

This is a continuation-in-part application filed Sept. 27, 1982, Ser. No. 424,555 and now abandoned.

BACKGROUND OF THE INVENTION

1. Field of the Invention

This invention relates to a liquid crystal display device, which is effective as display means for vehicle gauges using liquid crystal and, more particularly, to an assembly comprising a display section including a liquid crystal element having a liquid crystal cell containing sealed liquid crystal, an electric circuit section including a circuit board provided with electronic components for controlling the display on the display section and leads, a retainer for holding the display section, and a light transmissive carrier consisting of a light transmissive material for illuminating the display section at night.

2. Prior Art

Recently, electoronics is being employed extensively in various fields. Electronics is also used in automobile and motorcycle gauges, that is, the conventional speedmeters and rotation meters are being replaced with gauges in which the rotations of wheel axle per unit time, i.e., the running speed, and ignition pulses per unit time, i.e., the engine rotational speed are displayed on a display section by detecting corresponding pulse signals.

The display devices of these display systems can suitably use a liquid crystal element, in which the transmission of light through it is controlled for display according to changes in the direction of orientation of molecules caused with application of a voltage.

Liquid crystal elements consume less power than display devices of other types such as light-emitting diodes and fluorescent display tubes and can also be made to have a thin, flat shape. From the point of view of weight, furthermore, they are superior to other thin, flat display devices such as plasma display panels. In addition, they can not only have a long lifetime themselves but also reduce the rate of power consumption on the batteries carried on the vehicle. They require less space for mounting and the overall weight of the gauge can be reduced. These are some of the reasons why they are extremely useful as display means for vehicle gauges.

Display devices using liquid crystal elements are disclosed in U.S. Pat. No. 4,012,117, U.S. Pat. No. 4,118,111 and U.S. Pat. No. 4,042,294. In one of the disclosed display devices, a liquid crystal element, which comprises a liquid crystal cell including liquid crystal sealed between a pair of transparent electrode substrate and polarizer applied to the outer surface of the liquid crystal cell, is disposed via a conducting member on a wiring circuit board which provides driving signals for controlling the display on the liquid crystal element according to an electric signal representing the state of a corresponding detection spot. In this device, the liquid crystal element is locked to the wiring circuit board via the conducting member by a retainer member, which is secured to the wiring circuit board such that it is in contact with and covers edge portions of the front side and edges of the liquid crystal element. In another disclosed device, an illumination light source is disposed on the rear side of a liquid crystal element. The liquid crystal display device is placed in a gauge case provided with a front glass, and its wiring circuit board is secured to the gauge case.

The liquid crystal display devices disclosed in the above references, however, contain a large number of parts, so that their assembly requires a great deal of man-hours and they are inferior in operation control. In particular, the conducting member must be positioned with great care to obtain accurate electric connections between the lead terminals of the liquid crystal element and the lead terminals of the wiring circuit board. When securing the retainer to the wiring circuit board, furthermore the conducting member is liable to become displaced from its proper position. In this case, failure of display or erroneous display of the liquid crystal element would result. For this reason, great care is required for the assembly, so that the assembly operation requires great care and long time and it is difficult to improve the operation control of the assembly.

In general, liquid crystal display devices for vehicle gauge include a large number of component parts. Parts such as circuit boards, a reflector, a light transmissive member and liquid crystal elements are sequentially placed one on top of another while flanges on the housing press the liquid crystal elements from above so that these components can be assembled while they are held together. These constituent parts, however, are not designed to maintain any positional relationships among them, nor is there any particular part which may serve as the "foundation piece". When these many component parts are piled up one by one sequentially, therefore, errors in alignment, even if each negligibly small, may add up so that the total misalignment from the bottom to the top component can be quite significant. It takes both attention and time to prevent these alignment errors and this affects the production efficiency. Moreover, since the component parts are held together only by the pressure in the vertical direction, the assembly is weak against externally caused vibrations. Since there is provided no positioning means against vibrations in transverse directions, large displacements are likely to result and this may prove to be a fatal defect if the device is used as a vehicle gauge.

In U.S. Pat. No. 4,367,467, there is disclosed a method of assembling a circuit board, a holder, a liquid crystal display, a lens and a cover member. According to this method, the circuit board serves as the "foundation piece" and tabs on the holder engage in apertures in the circuit board while cutout sections on the circuit board are engaged with the clips on the cover member. The liquid crystal display is placed inside the holder shaped like the frame and held by a spring means, while the lens between the liquid crystal display and the cover member is pressed in place by wing-like structures. Thus, this method is advantageous in that the assembly can be made easily without the need for screws or bolts. This device, however, is not suited for use as a vehicle gauge for the following reasons. Firstly, the frame-like holder can be deformed easily by external vibrations which are unavoidable when the device is used as a vehicle gauge. Secondly, the liquid crystal display held by a spring means is likely is to start vibrating strongly in response to external vibration. Thirdly, a vehicle gauge must be usable at night as well as during daylight hours but there is no means provided for guiding a light beam from the light source to the back side of the liquid crystal display. In short, the device disclosed in this patent includes only a relatively small number of components so that the total misalignment will also be relatively small. Thus, the method of assembly disclosed therin may be satisfactory regarding such devices with relatively few components to be assembled. For assembling a display means usable as a vehicle gauge and comprising a much larger number of components, therfore, a different assembly method must be devised and utilized for producing a device which can be used both during the day and at night and which is vibration resistant.

In a still further aspect, liquid crystal display devices of the so-called transmitting type, which are illuminated from the rear side of the liquid crystal element, may be suited for display when the ambient light intensity is low such as at night, but the display becomes somewhat less clear to the eyes when the ambient light intensity is higher than the light intensity of the illumination source such as during daytime. This may be overcome by using an illumination light source having high illumination capacity. The high illumination capacity light source, however, is bulky, and there is a limitation on the space on the rear side of the liquid crystal element. In addition, the power consumption and heat generation are increased. In paticular, an increase of the heat generation in the illumination light source increases the heating of the liquid crystal element, so that erroneous display or failure of display of the liquid crystal element is likely to result. As for liquid crystal display devices of the so-called reflecting type having a reflector on the rear side of the liquid crystal element instead of an illuminating light source, on the other hand, the ambient light may be utilized for display during the day but there may usually be not enough light available at night for display. In order to overcome this problem, it again may be necessary to provide a light source in front of the liquid crystal element.

In a still further aspect, if a tungsten lamp is used because it is readily available and its running cost is comparatively low, the liquid crystal element cannot be illuminated with a uniform intensity since the lamp offers only a point light source. In other words, the brightness varies, with the light intensity being higher for portions closer to the light source and lower for portions more remote from the light source. This is undesirable from the standpoint of easy and accurate reading of the display on the liquid crystal element.

SUMMARY OF THE INVENTION

A first object of the invention is to provide an improved liquid crystal display device of the type assembled in a vehicle or motorcycle gauge for displaying the state of a plurality of detection items such as running speed and engine rotational speed with a liquid crystal element, which permits easy and accurate assembly of its component parts.

A second object of the invention is to provide a liquid crystal display device of the afore-mentioned type, which is stable against external vibrations.

A third object of the invention is to provide a liquid crystal display device of the afore-mentioned type, with which satisfactory display can always be obtained regardless of the ambient light intensity both during daytime and at night.

A fourth object of the invention is to provide a liquid crystal display device of the afore-mentioned type, in which the liquid crystal element can be illuminated with uniform light intensity.

The above and further objects, features and advantages of the invention will become more apparent from the following description when the same is read with reference to the accompanying drawings.

BRIEF DESCRIPTION OF THE DRAWINGS

In the Figures, like parts are designated by like reference numerals and symbols.

DETAILED DESCRIPTION OF THE PREFERRED EMBODIMENT

Figure 1:
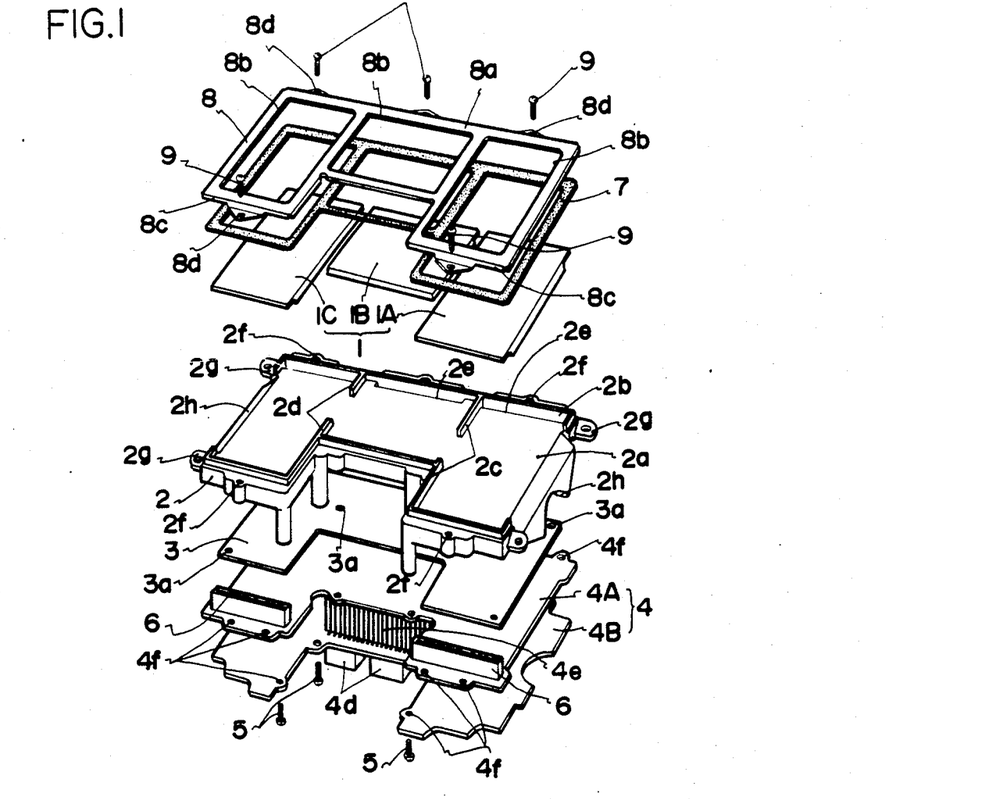
FIG. 1 is an exploded perspective view showing an embodiment of the liquid crystal display device according to the invention.

FIG. 1 is an exploded perspective view showing an embodiment of the invention applied to a motorcycle gauge display device.

Figure 2:
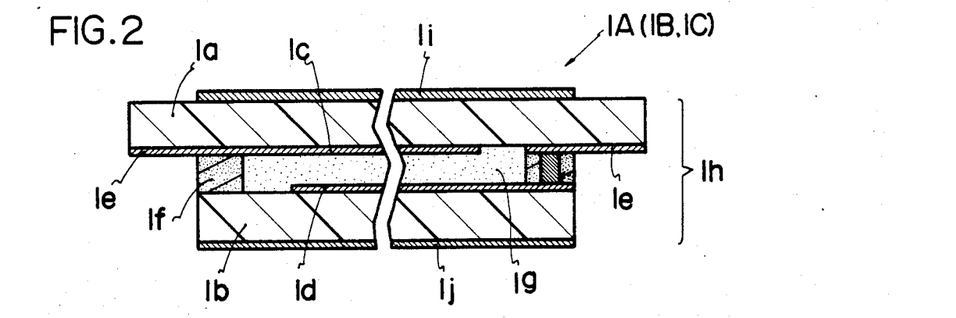
FIG. 2 is a fragmentary sectional view showing a liquid crystal element used for the same liquid crystal display device.

No. 1 is a display section including a plurality of liquid crystal elements 1A, 1B and 1C. The liquid crystal elements 1A, 1B and 1C have the same construction, so that element 1A will be typically described in detail with reference to a fragmentary sectional view of FIG. 2. The element includes electrode substrates 1a and 1b of a transparent insulating material, e.g., glass. Electrodes 1c and 1d are formed on opposed inner surfaces of the electrode substrates 1a and 1b. These electrodes 1c and 1d are made of transparent conductive films, e.g., ITO films, forming patterns to be displayed on the liquid crystal element 1A. The electrodes 1c have exposed terminal portions 1e extending up to the rear edge of the front electrode substrate 1a. The electrode substrates 1a and 1b are spaced apart by spacers 1f interposed between them along the edges thereof. A field-effect type liquid crystal 1g is sealed between the electrode substrates 1a and 1b. The liquid crystal is a P-type twistnematic liquid crystal with positive dielectric anisotropy in which the centers of mass of the molecules are randomly distributed spatially and the long axes of the molecules are pointing in one direction, and is such that the plane of polarization of polarized light passing through it will be rotated by 90 degrees as it travels from the electrode substrate 1a to the other electrode substrate 1b. The above parts constitute a liquid crystal cell 1h. Polarizing plates 1i and 1j, each of which can transmit light polarized only in one direction, are affixed to the front and rear sides of the liquid crystal cell 1h such that their polarization axes are perpendicular to each other. In this liquid crystal element 1A, the initial molecular orientation is maintained in the liquid crystal 1g unless a voltage at a predetermined level is generated between the electrodes 1c and 1d in response to a voltage applied to the exposed electrode terminals 1e. In this state, polarized light from the rear polarizing plate 1j reaches the front polarizing plate 1i after its polarization axis has been rotated by 90 degrees as it passes through the liquid crystal cell 1h, or the direction of the polarization axis and the direction of the polarizing plate 1i coincide. With light transitted in this way, the liquid crystal element 1A will appear bright all over. This is the same as having no display at all. If the voltage applied the exposed electrode terminal 1e is changed according to the state of the corresponding detection spot and a voltage in excess of the afore-mentioned predetermined level is produced between the corresponding overlapped portions of the electrodes 1c and 1d, the long axes of molecules of only a portion of the liquid crystal 1g between the electrodes 1c and 1d where the afore-mentioned voltage is generated, become pependicular to the planes of the electrode substrates 1a and 1b. The polarized light from the rear polarizing plate 1j reaches the front polarizing plate 1j such that the twisting of its polarization axis does not take place for the portion of the liquid crystal 1g in which the molecules are re-orientated. Thus, in this case, the polarization axis of the polarized light and that of the polarizing plate 1j are perpendicular to each other in the re-orientated portion so that light is not transmitted in this portion of the liquid crystal element 1A. This means that a dark "pattern" is produced against a bright "background". In other words, a positive display of a numerical value, a graduation, a drawing pattern, etc. can be obtained to represent the state of the detection spot. The description so far has been based on the assumption that use is made of light proceeding through the liquid crystal element 1A from the back side thereof, or that the liquid crystal element 1A is used as a transmitting type element. However, the same principles apply if light proceeding through the liquid crystal element 1A is used or if the liquid crystal element 1A is used as a reflecting type element. This is so because the light incident on the front side of the liquid crystal element 1A and transmitted through the same is reflected at the rear side of the element 1A and is transmitted again through the element 1A. For this reason, detailed description in this connection is omitted.

Figure 3:
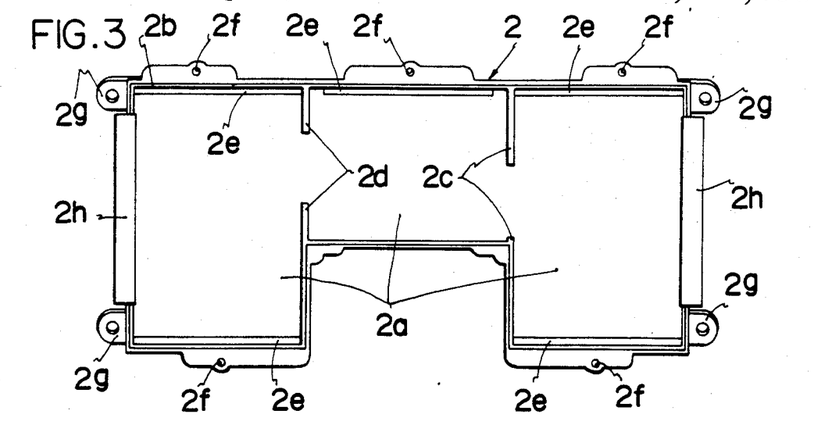
FIG. 3 is a front side plan view showing a light transmissive carrier used in the same liquid crystal display device.
Figure 4:
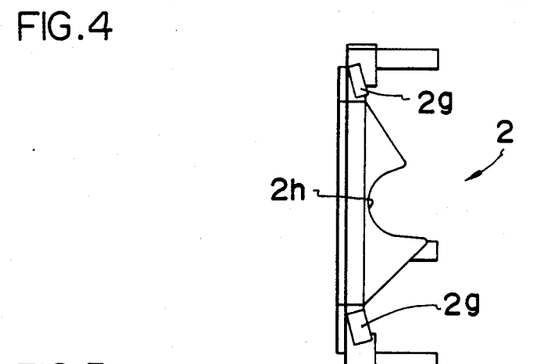
FIG. 4 is a side view of the same light transmissive carrier.
Figure 5:
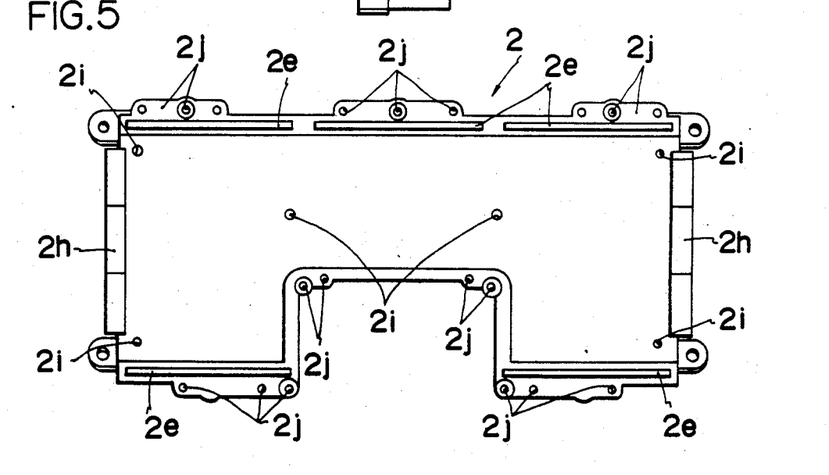
FIG. 5 is a rear side plan view showing the same light transmissive carrier.

No. 2 is a light transmissive carrier made of a transparent synthetic resin material, e.g., a polycarbonate resin or an acrylic ester resin. FIG. 3 is a front side plan view of the carrier 2. It has a front support surface 2a, on which the liquid crystal element 1A, 1B and 1C are secured either in direct contact with it or via a slight space so that these elements form the display section 1. Ribs 2b project upright from edges of the front support surface 2a. When the liquid crystal elements 1A, 1B and 1C are set on the front support surface 2a, the ribs 2b are in contact with and cover corresponding edge portions of the elements 1A, 1B and 1C. First intermediate ribs 2c also project from the support surface 2a. When the liquid crystal elements 1A, 1B and 1C are set on the front support surface 2a, these ribs 2c intervene between the liquid crystal elements 1A and 1B to properly position the elements 1A and 1B and also they are in contact with and cover corresponding edge portions of the elements 1A and 1B. Second intermidiate ribs 2d also project from the front support suface 2a. When the liquid crystal elements 1A, 1B and 1C are set on the front support surface 2a, these ribs 2d intervene between the liquid crystal elements 1B and 1C to properly position the elements 1B and 1C and in contact with and cover corresponding edge portions of the elements 1B and 1C. The carrier 2 has elongate apertures 2e formed adjacent to some portions of the ribs 2b. Connectors (to be described later) are inserted through the apertures 2e to electrically connect the liquid crystal elements 1A, 1B and 1C disposed on the front support surface 2a and an electric circuit section (to be described later) which is diposed on the rear side of the carrier 2 to supply drive signals to the liquid crystal elements 1A, 1B and 1C. The carrier 2 further has front mounting flanges 2f, to which a retainer (to be described later) for retaining the liquid crystal elements 1A, 1B and 1C is secured, and also has side mounting flanges 2g, to which a gauge case (to be described later) is secured. Further, as shown in FIG. 4, at least one of the opposite sides of the carrier 2 is provided with a liquid guide member 2h, through which light from a light source (not shown) provided on one side of or behind the carrier 2 can be introduced. FIG. 5 is a rear plan view of the carrier 2. As is shown, the rear side of the carrier 2 is provided with projections 2i for mounting a reflector (to be described later) and also serving positioners and projections 2j for positioning and mounting the afore-mentioned electric circuit section.

Figure 6:
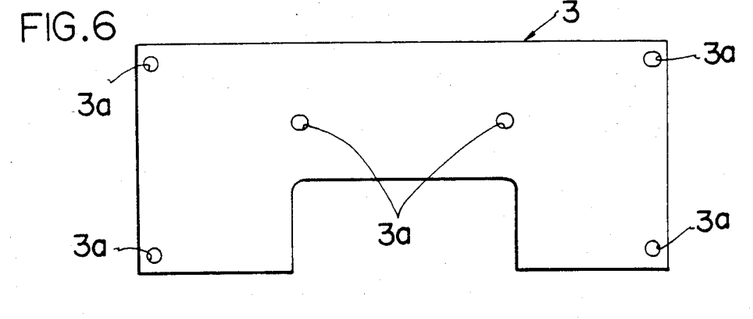
FIG. 6 is a plan view showing a reflector used in the same liquid crystal display devices.

No. 3 is a reflector which is made of a plate of a synthetic resin having a high light reflectivity, e.g., a polycarbonate resin or an acrylic ester resin. The reflector 3 is assembled on the rear side of the carrier 2. FIG. 6 is a plan view showing the reflector 3. The reflector 3 at least has an area corresponding to the display section 1. It serves to reflect light from the carrier 2 back toward the display section, thus providing for enhanced illumination effect. It may be provided, if necessary, with a white coating to increase the reflecting effect. It has mounting holes 3a formed at positions corresponding to the projections 2i formed on the rear side of the carrier 2.

Figure 7:
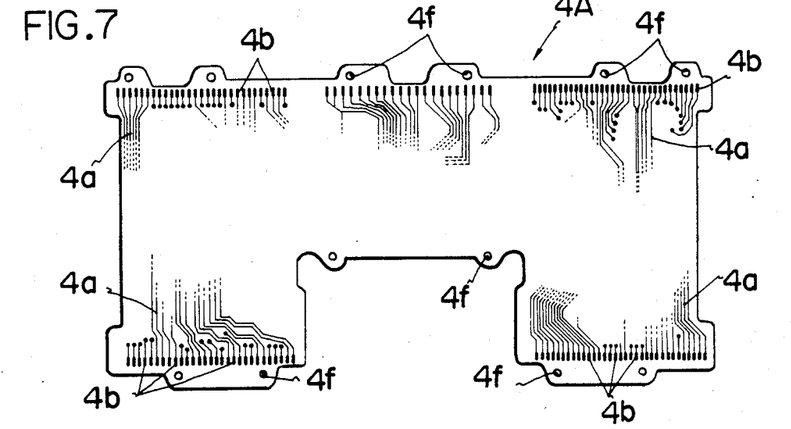
FIG. 7 is a front side plan view showing one of a pair of wiring circuit boards used for the same liquid crystal display device.
Figure 8:
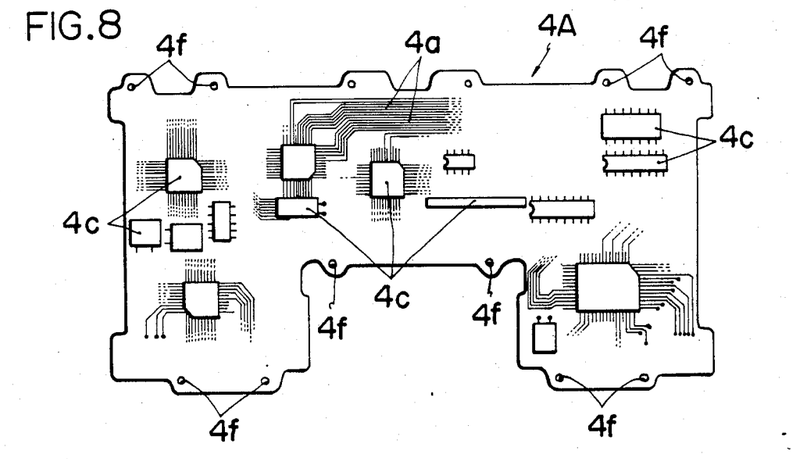
FIG. 8 is a rear side plan view showing the same wiring circuit board.
Figure 9:
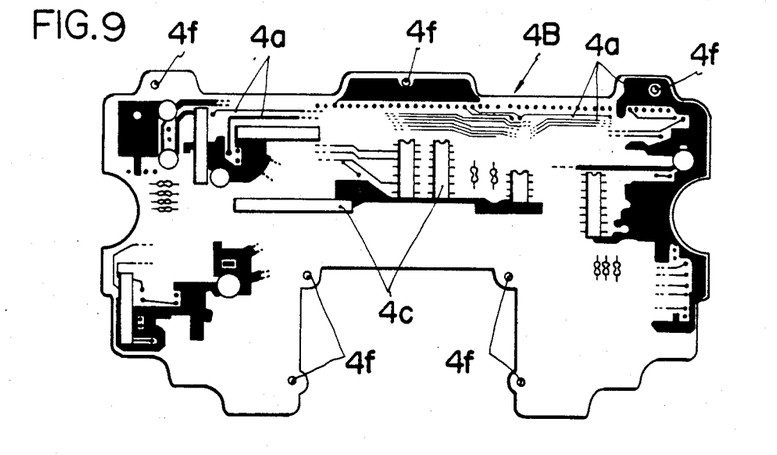
FIG. 9 is a front side plan view showing the other wiring circuit board of the same liquid crystal display device.
Figure 10:
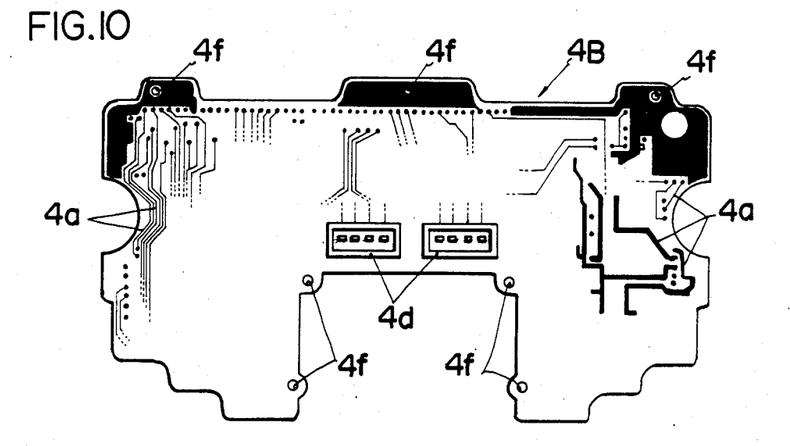
FIG. 10 is a rear side plan view showing the same other wiring circuit board.

No. 4 is an electric circuit section, which receives electric signals representing the state of corresponding detection spots and supplies corresponding driving signals to the display section 1 to control the display. The section is assembled on the rear side of the reflector 3. It includes one or more electrically insulating wiring circuit boards. Here are shown two wiring circuit boards 4A and 4B made of glass or epoxy-resin plates. FIG. 7 is a front side plan view of the wiring circuit board 4A. As is shown, the front side of the wiring circuit board 4A is provided with leads 4a formed by patterning a conductor, e.g., copper or gold, and exposed lead terminals 4b formed as extension of the leads 4a and along the edges of the board 4A such that they are found right beneath the elongate apertures 2e of the carrier 2 when the board 4A is assembled on the carrier 2. FIG. 8 shows a rear side plan view of the wiring circuit board 4A. As is shown, the rear side of the board 4A is provided with leads 4a and electronic circuit components 4c, e.g., resistors, capacitors, transistors, and IC. FIG. 9 is a front side plan view of the wiring circuit board 4B. As is shown, the front side of the board 4B is provided with leads 4a and electronic circuit components 4c similar to the rear side of the wiring circuit board 4A. FIG. 10 is a rear side plan view showing the wiring circuit board 4B. As is shown, the rear side of the board 4B is provided with leads 4a and connectors 4d, to which electric signals from detection spots are supplied. The leads 4a and exposed lead terminals 4b are formed by means of printing or deposition and etching process. The electronic circuit components 4c and connectors 4d are mounted by soldering. The wiring circuit boards 4A and 4B are electrically connected together by flexible wires 4e (see FIG. 1), stacked and secured together to the rear side of the carrier 2 by set screws 5 (see FIG. 1), which are screwed through mounting portions 4f into the projections 2j. The mounting portions 4f are provided on the wiring circuit boards 4A and 4B at edges thereof and correspond to the projections 2j of the carrier 2.

Figure 11:
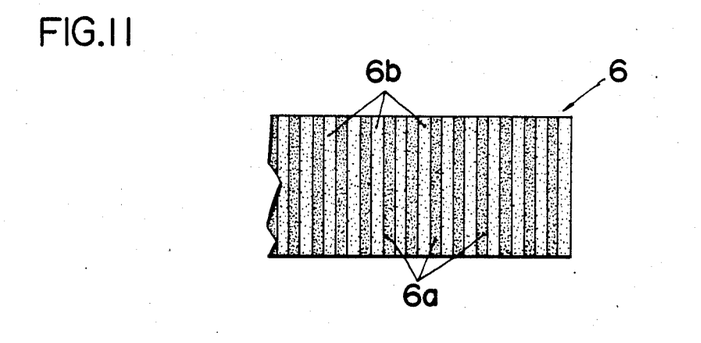
FIG. 11 is a fragmentary sectional view showing a connector used for the same liquid crystal display device.

No. 6 are connectors mentioned earlier. These connectors are called interconnectors or zebra strips, and they are disposed in the elongate apertures 2e of the carrier 2 to electrically connect the display section 1 and the electric circuit section 4. FIG. 11 is a fragmentary sectional view showing one of such connectors 6. It consists of conductive rubber layers 6a and insulating rubber layers 6b alternately arranged in the longitudinal direction and laminated together. It is assembled such that its front end is in contact with the exposed terminals 1e of the liquid crystal element 1A, 1B or 1C and its rear end is in contact with the exposed terminals 4b of the wiring circuit board 4A, thus electrically connecting the display section 1 and the electric circuit section 4.

Figure 12:
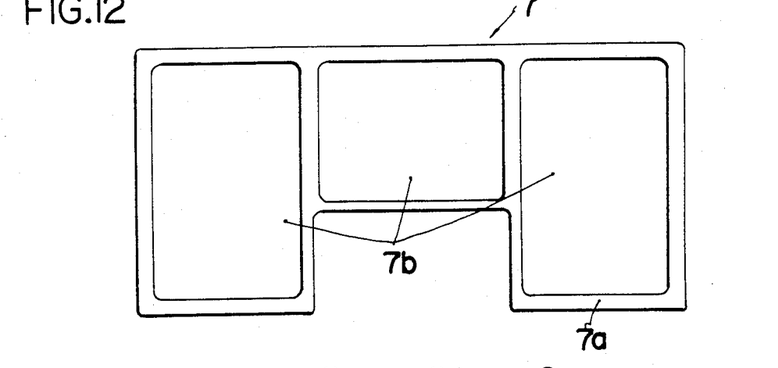
FIG. 12 is a plan view showing a packing used for the same liquid crystal display device.

No. 7 is a packing made of an elastic material, e.g., chloroprene synthetic rubber, and covers the front side of the display section 1. FIG. 12 is a plan view showing the packing 7. It is stamped from a plate and has portions 7a, which correspond to the edges of the liquid crystal elements 1A, 1B and 1C and define windows 7b.

Figure 13:
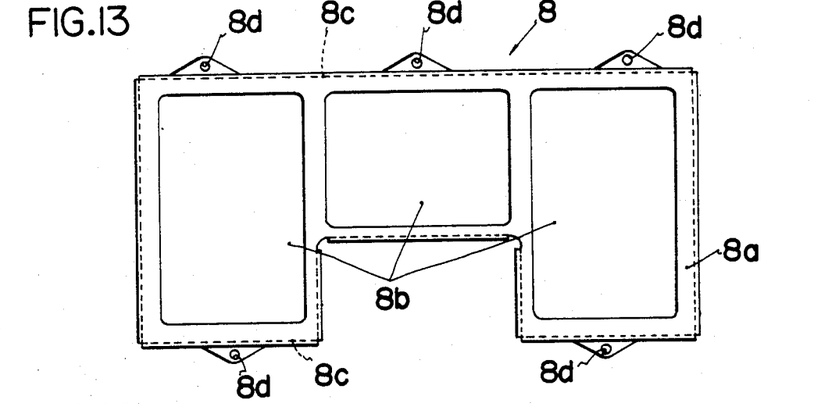
FIG. 13 is a plan view showing a retainer used for the same liquid crystal display device.

No. 8 is the afore-mentioned retainer, which is formed from a hard material, e.g., an iron plate provided with a rust-proof plating, and covers the front side of the display section 1 via the packing 7. FIG. 13 is a plan view showing the retainer 8. Like the packing 7, the retainer 8 has portions 8a, which correspoond to the edges of the liquid crystal elements 1A, 1B and 1C and define windows 8b. The retainer 8 also has side portions 8c extending substantially at right angles from the outer edges of the portions 8a. The retainer 8 further has mounting portions 8d, which extend substantially horizontally from several places of the side portions 8c and facing the mounting portions 2f of the carrier 2. The portions 8a of the retainer 8 cover the edges of the liquid crystal elements 1A, 1B and 1C that constitute the display section 1 via the packing 7, while the side portions 8c of the retainer 8 cover the outer surfaces of the ribs 2b of the carrier 2. The retainer 8 is secured via the packing 7 to the front side of the carrier 2 by set screws 9 (see FIG. 1), which are screwed through the mounting portions 8d of the retainer 8 into the mounting portions 2f of the carrier, so that they firmly hold the liquid crystal elements 1A, 1B and 1C of the display section 1 on the front support surface 2a of the carrier 2.

The component parts described so far constitute the liquid crystal display device 10.

The assembly of the component parts will now be described.

First, the liquid crystal elements 1A, 1B and 1C of the display section 1 are set in predetermined portions on the front side of the carrier 2 which serves as the "foundation piece" for the assembly, these portions being determined by the ribs 2b and intermediate ribs 2c and 2d of the carrier 2.

Next, the packing 7 and the retainer 8 are fitted on to cover the front side of the display section 1. At this time, the edges of the liquid crystal elements 1A, 1B and 1C are covered by the corresponding portions 7a and 8a of the packing 7 and retainer 8, while the outer surface of the ribs 2b of the carrier 2 are covered by the side portions 8c of the retainer 8. It is possible to preliminarily bond the packing to the rear side of the retainer 8. After the parts mentioned above are set in correct positions, the mounting portions 8d of the retainer 8 are secured to the mounting portions 2f of the carrier 2 with the screws 9 screwed from the front side, thus locking the display section 1, packing 7 and retainer 8 to the front side of the carrier 2.

The reflectors 3 is then locked to the rear side of the carrier 2 by fitting its mounting holes 3a on the projections 2i of the carrier.

Next, the connectors 6 are inserted into the apertures 2e of the carrier 2 from the rear side thereof to bring their front ends into contact with the exposed terminals 1e of the liquid crystal elements 1A, 1B and 1C in front of them.

The wiring circuit boards 4A and 4B, which constitute the electric circuit section 4 including the leads 4a, exposed terminals 4b, electronic components connectors 4d and flexible wires 4e, are then set on the rear side of the carrier 2 such that the rear ends of the connectors 6 are in contact with the exposed terminals 4b of the wiring circuit board 4A. In this state, the mounting portions 4f of the wiring circuit boards 4A and 4B are secured by screws 5 to the mounting sections 2j of the carrier 2. Thus, the wiring circuit boards 4A and 4B are assembled in a laminated state on the rear side of the carrier 2. At this time, the electric circuit section 4 is secured in position with the connectors 6 slightly compressed between the liquid crystal elements 1A, 1B and 1C and wiring circuit board 4A.

Figure 14:
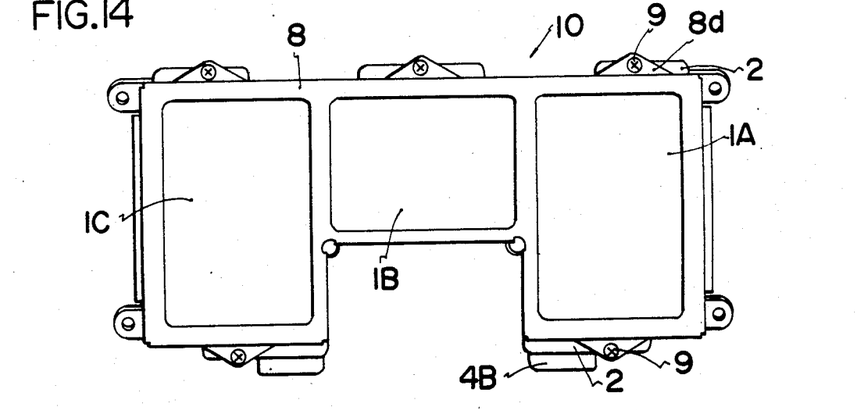
FIG. 14 is a front side plan view showing the same liquid crystal display device.
Figure 15:
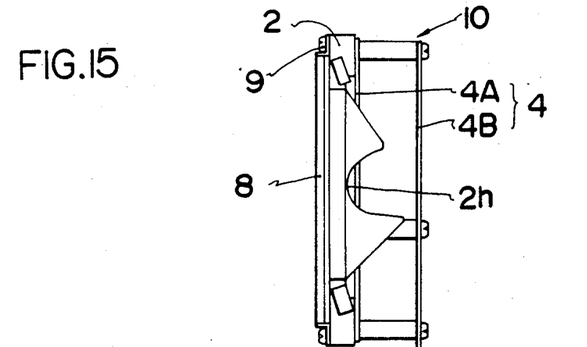
FIG. 15 is a side view showing the same liquid crystal display device.
Figure 16:
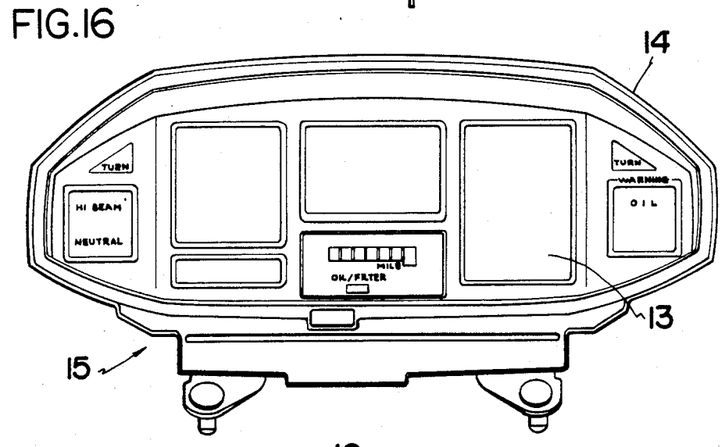
FIG. 16 is a front side plan view showing the same liquid crystal display device when assembled in a motorcycle gauge.
Figure 17:
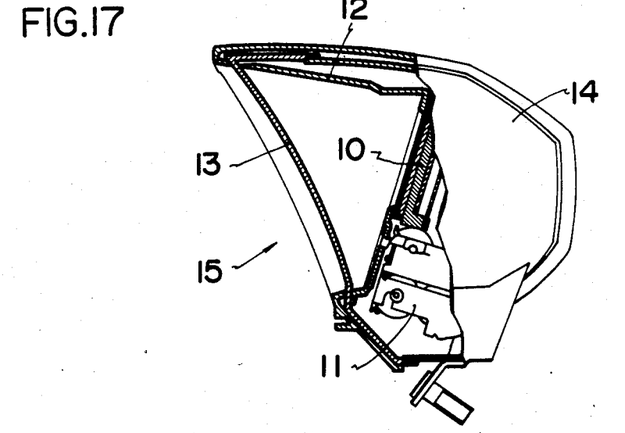
FIG. 17 is a partly broken-away side view of the same motorcycle gauge.

In the above way, the assembly of the component parts is completed to obtain the liquid crystal display device 10, as shown in FIGS. 14 and 15. This liquid crystal display device 10, as shown in a front side plan view of FIG. 16 and in a partly broken-away slide view of FIG. 17, is mounted together with an integrator 11 for displaying the total travelled distance, an illumination light source (not shown) and a face plate 12 covering it and the integrator 11 and having windows corresponding to the display area in a gauge case 14, which is made of a hard resin material provided with a front glass 13 made of a transparent synthetic resin material. At this time, the mounting portions 2g of the carrier 2 are secured. The liquid crystal display device 10 thus constitutes a part of the motorcycle gauge 15.

With the liquid crystal display device 10 described above, the carrier 2 is made a foundation piece for assembling the device as mentioned earlier. That is, the other parts, i.e., display section 1, packing 7, retainer 8, reflector 3, connectors 6 and electric circuit section 4, are successively assembled in predetermined positions on the carrier 2, and they are secured to one another by the set screws 9 and 5, which secure the retainer 8 and electric circuit section 4 to the carrier 2 from the front side and rear side respectively. Thus, these parts can be automatically assembled properly with respect to one another among themselves if care is taken only of their positional relationships to the carrier 2. Thus, compared to the prior art structure, which requires each of the component parts to be assembled by confirming its positional relations to the other parts, the asembly can be greatly simplified to reduce the work of the operator and the time required for the assembly. Thus, it is possible to greatly improve the operation control of the assembly operation. Particularly, the connectors 6, which electrically connect the display section 1 and electric circuit section 4, must be accurately positioned to obtain satisfactory state of electric connection between the exposed terminals 1e of the liquid crystal elements 1A, 1B and 1C of the display section 1 and exposed terminals 4b of the wiring circuit board 4A of the electric circuit section 4. With the liquid crystal display device 10 described above, the connectors 6 can be properly positioned by merely inserting them into the elongate apertures 2e provided in the carrier 2. At the same time, displacements and strains of the connectors 6 can be eliminated. Thus, the connectors 6 can be easily set in proper positions.

Figure 18:
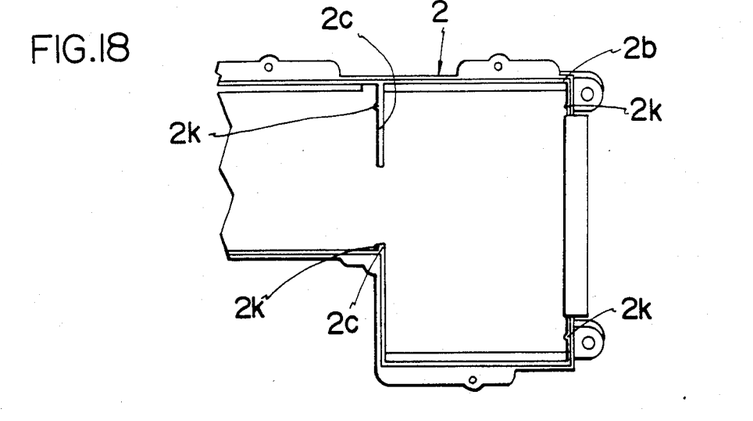
FIG. 18 is a fragmentary plan view showing an improved construction of carrier over the construction shown in FIG. 3.

Further, the liquid crystal elements 1A, 1B and 1C of the display section 1 are positioned by the ribs 2b and intermediate ribs 2c and 2d of the carrier 2, and their sides are held in contact with these ribs, while the connectors 6 are required in the horizontal direction by the liquid crystal elements 1A, 1B and 1C and wiring circuit board 4 and in the vertical direction by the side surfaces of the elongate apertures 2e of the carrier 2. Thus, even if vibrations are externally caused in the gauge 15 mounted on the handle of a motorcycle during the running thereof and transmitted to the liquid crystal display device 10 through the securing portions 2g of the carrier 2, no uncomfortable noise is experienced because the liquid crystal elements 1A, 1B and 1C and connectors 6, which used to be caused to vibrate somewhat, are now held in tightly locked conditions. Further, if slight projections 2k are provided on the side walls of the ribs 2b and intermediate ribs 2c and 2d of the carrier 2 at several positions such that they project toward the edges of the liquid crystal elements 1A, 1B and 1C, when the liquid crystal elements 1A, 1B and 1C are set on the front support surface 2a at the positions determined by the ribs 2b and intermediate ribs 2c and 2d, they can be firmly locked by the slight projections 2k in addition to the ribs 2b and intermediate ribs 2c and 2d which are in direct contact. This arrangement can thus enhance the stability against the externally caused vibrations.

Figure 19:
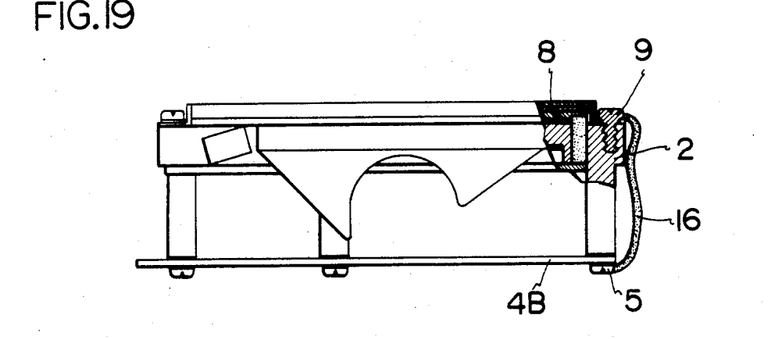
FIG. 19 is a side view, partly in section, showing the same liquid crystal display device.

Further, as shown in FIG. 19, the retainer 8 which holds the display section 1 against the carrier 2 from the front side, may be grounded by a jumper cable 16, which is secured at one end by a screw 9 to a mounting portion 8d of the retainer 8 and secured at the other end by a screw 5 to a mounting portion 4f of the wiring circuit board 4B which has a ground level lead 4a. If this is done, when the front glass 13 is wiped with a cloth, no charge movement will take place between the electrode substrates 1a and 1b of the liquid crystal elements 1A, 1B and 1C due to discharge effect of the retainer 8 because in this case charges are not concentrated on the electrodes 1c and 1d or other low insulation resistance parts of the liquid crystal elements 1A, 1B and 1C. Thus, the liquid crystal elements 1A, 1B and 1C will never be adversely affected by the phenomenon of electrostatic charging, so that erroneous displays that might otherwise result in the display section 1 are reliabily eliminated. In other words, the display is controlled solely by the driving signals which selectively supplied from the electric circuit section 4 through the connectors 6 and the exposed terminals 1e to the electrodes 1c and 1d of the liquid crystal elements 1A, 1B and 1C, and thus the reliability can be improved.

Figure 20:
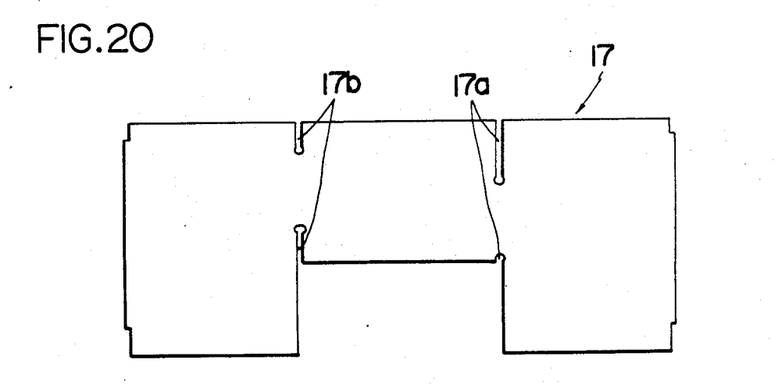
FIG. 20 is a plan view showing a semi-transparent reflector used for the same liquid crystal display device.

Further, the liquid crystal display device 10 described can be used in either one of two methods, namely as a reflecting type device when the ambient light intensity is sufficient such as during daytime and as a transmitting type device when the ambient light intensity is low such as at night. Thus, satisfactory display can be obtained regardless of the ambient light intensity during daytime or at night. More particularly, when the ambient light intensity is sufficient such as during daytime when external light is readily available, the illumination light source may be held "off", and the external light incident on the front side of the liquid crystal display device 10 may be used as light source for display. In this case, the liquid crystal display device 10 serves as a reflecting type device, with the incident light being reflected by the reflector 3 disposed on the rear side of the liquid crystal elements 1A, 1B and 1C of the display section 1. When the ambient light intensity is low such as at night when sufficient external light cannot be obtained, light from the illumination light source, which is accommodated together with the liquid crystal display device 10 in the gauge case 14 and can be turned on with a driver's switch operation for illuminating the whole motorcycle gauge 15, is led through the light guide 2h of the carrier 2. In this case, the liquid crystal display device 10 serves as a transmitting type device, with the introduced light being reflected by the inner walls of the carrier 2 and reflectors 3 to provide display light directed toward the liquid crystal elements 1A, 1B and 1C of the display section 1. In this way, the liquid crystal display device 10 can be switched between the reflecting type mode and transmitting type mode depending upon the ambient light intensity so that satisfactory display can be obtained under all conditions. The driver can thus read the display correctly without being influenced by the ambient light intensity. The display visibility can be further improved by providing a semi-transparent reflector 17 as shown in FIG. 20. The semi-transparent reflector 17 is made of a material, which can transmit a part, e.g., one-half, of the incident light while reflecting the rest, e.g., an acrylic ester resin or a polyester resin. It has the same shape as the reflector 3, and it is interposed between the display section 1 and carrier 2. When the liquid display device 10 is used as a reflecting type device, the greater distance between the display section 1 and a light reflecting member, the greater is the different of the shade of a "pattern" display of the liquid crystal elements 1A, 1B and 1C formed on the front side of the light reflecting member from the "pattern" in the aforementioned sense, and this has an adverse effect on visibility to the driver. By providing the semi-transparent reflector 17, the distance between the liquid crystal elements 1A, 1B and 1C and the light reflecting member can be reduced and this also dimishes the difference mentioned above. Further, the front side of the semi-transparent reflector 17 may be made in any desired color. By painting the front surface of the semi-transparent reflector 17 in a desired color, the color of the "background" of the liquid crystal elements 1A, 1B and 1C can be freely determined. Thus, the semi-transparent reflector can be utilized as a sort of filter, so that it is possible to provide a liquid crystal display device of a very satisfactory display character. This semi-transparent reflector 17 may also be mounted easily without spoiling the advantages regarding the assembly because it is provided with slits 17a, 17b such that the intermediate ribs 2c and 2d of the carrier 2 may be engaged in these slits 17a, 17b.

Figure 21:
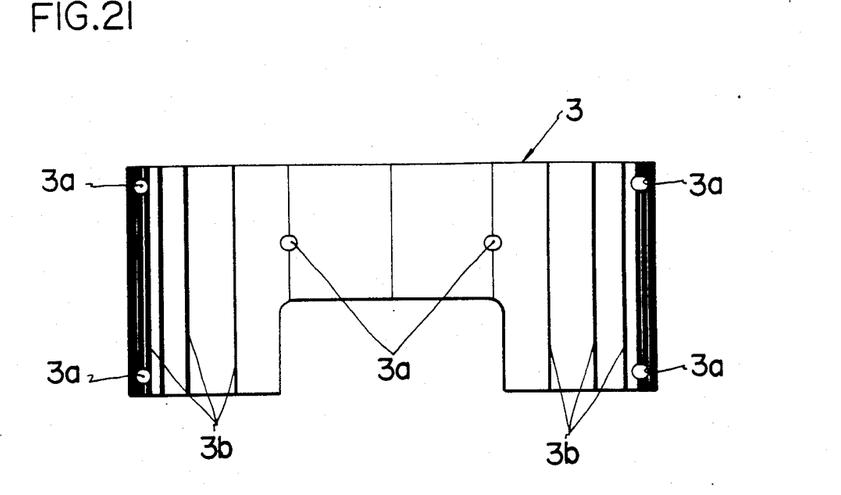
FIGS. 21 and 22 are plan views showing improved structures of reflector over the reflector shown in FIG. 6.
Figure 22:
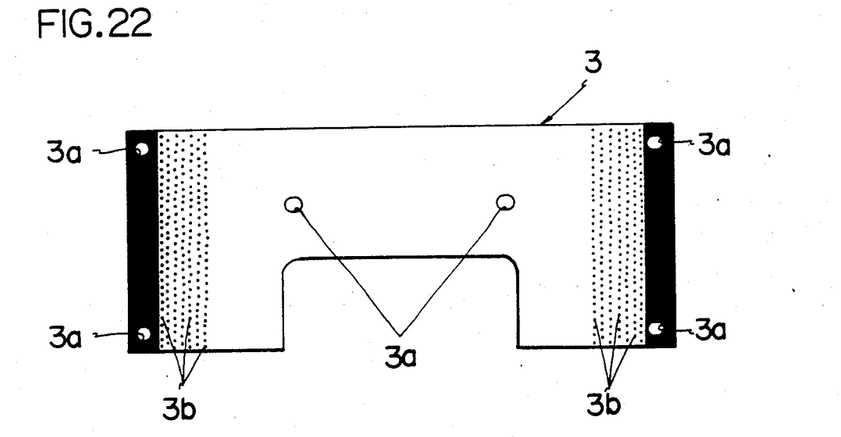

Further, when the liquid crystal display device 10 is used with the illuminating light source at night, since the display section 1 is illuminated from the plate-like light transmissive carrier 2, even if a tungsten light is used as the illumination light source, the light from the source is diffused within the carrier 2 to illuminate the display section 1 with substantially uniform light intensity distribution over the entire display area, i.e., without fluctuations of the light intensity in the display section 1 as is the case in the prior art. Further, as shown in FIGS. 21 and 22, the front surface of the reflector 3 may be provided with a reflected light adjusting section 3b such that the area occupied by the section per unit area is increased as one goes toward the light guide 2h, i.e., toward the illumination light source. The reflected light ajustment section 3b may be formed by printing with a light-absorbing material, e.g., a black paint. With this arrangement, the quantity of light reflected by the portion of the carrier 2, which is nearer the light source and would otherwise send light of a higher intensity to the display section 1, is reduced by the reflected light adjusting section 3b of the reflector 3. Brightness is thus reduced compared to the case in the absence of the reflected light adjusting section 3b. On the other hand, the portion of the reflector 3 at a greater distance from the light source does not absorb light so much and the quantity of light from that portion to the display section 1 is substantially the same as in the absence of the reflected light adjusting section 3b. Thus, the display section 1 can be illuminated from the carrier 2 with a substantially uniform light intensity over the entire area. In other words, the brightness flucuations can be eliminated or at least reduced. While the illustrated examples of the reflected light adjusting section 3b show patterns consisting of stripes or dots, it is also possible to use a lattice or other patterns. Further, instead of printing with paint to form the reflected light adjusting section 3b, it is possible to provide a separate reflected light adjusting section consisting of a transparent thin film having a pattern of light absorbing material on the front surface of the reflector 3 to obtain the same effects.

Further, while in the above embodiment the display section 1 was shown to include a plurality of liquid crystal elements 1A, 1B and 1C, the same effects can be obtained with a single liquid crystal element.

As has been described in the foregoing, according to the invention it is possible to realize a liquid crystal display device, which permits accurate and easy assembly of the component parts, has a strong structure against external vibrations, its free from erroneous display due to the electrostatic charging phenomenon, can provide satisfactory display regardless of the ambient light intensity, i.e., whether the device is used during daytime or at night, and is free from variations of the illumination intensity. Thus, the device can be effectively used as display means for automobile and motorcycle gauges.

It will be understood by one skilled in the art that the embodiment of the invention described above is given for the purpose of illustration only and various changes and modifications can be made without departing from the scope and spirit of the invention.

What is claimed is:

1. A liquid crystal display device comprising
   a generally planar light guiding member having a mounting surface on the front side, a means for positioning and mounting on the back side and a light accepting means, said light guiding member being so structured that light entering through said light accepting means is projected toward said mounting surface,
   a liquid crystal display element mounted directly on said mounting surface,
   a holder with ribs, said holder being secured on said light guiding member and adapted to hold said liquid crystal display element from the front side thereof, said ribs protrudingly formed on said mounting surface and being adapted to be in contact sideways with and position said liquid crystal display element,
   a circuit board with electronic components electrically connected to said liquid crystal display element for controlling the display thereof, said circuit board being mounted on said light guiding member by said means for positioning and mounting, and
   a reflector means disposed between said light guiding member and said circuit board, said reflector means being adapted to reflect light entering said light guiding member through said light accepting means into the frontal direction.

2. The device of claim 1 wherein said ribs have several protrusions on their side surfaces, said protrusions being adapted to compress sideways against said liquid crystal display element for tightly positioning and mounting said liquid crystal displayment on said light guiding member.

3. The device of claim 2 wherein said reflector means has a reflection-controlling surface containing a light absorbing material, the amount of said light absorbing material per unit area of said reflection-controlling surface being greater near said light accepting means.

4. The device of claim 1 wherein said reflector means has openings and said means for positioning and mounting are protrusions on the back side of said light guiding member and are adapted to be inserted into said openings for securely mounting said reflector means on said light guiding member.

5. The device of claim 4 wherein said reflector means has a reflection-controlling surface containing a light absorbing material, the amount of said light absorbing material per unit area of said reflection-controlling surface being greater near said light accepting means.

6. The device of claim 1 wherein said reflector means has a reflection-controlling surface containing a light absorbing material, the amount of said light absorbing material per unit area of said reflection-controlling surface being greater near said light accepting means.

* * * * *